US009292801B2

(12) United States Patent
Fujimaki et al.

(10) Patent No.: US 9,292,801 B2
(45) Date of Patent: Mar. 22, 2016

(54) SPARSE VARIABLE OPTIMIZATION DEVICE, SPARSE VARIABLE OPTIMIZATION METHOD, AND SPARSE VARIABLE OPTIMIZATION PROGRAM

(71) Applicant: NEC CORPORATION, Minato-ku, Tokyo (JP)

(72) Inventors: Ryohei Fujimaki, Minato-ku (JP); Ji Liu, Madison, WI (US)

(73) Assignee: NEC CORPORATION, Tokyo (JP)

( * ) Notice: Subject to any disclaimer, the term of this patent is extended or adjusted under 35 U.S.C. 154(b) by 248 days.

(21) Appl. No.: 14/164,784

(22) Filed: Jan. 27, 2014

(65) Prior Publication Data
US 2014/0236871 A1     Aug. 21, 2014

Related U.S. Application Data

(60) Provisional application No. 61/767,038, filed on Feb. 20, 2013.

(51) Int. Cl.
    *G06N 99/00*     (2010.01)

(52) U.S. Cl.
    CPC .................. *G06N 99/005* (2013.01)

(58) Field of Classification Search
    CPC .................................................. G06N 99/005
    See application file for complete search history.

(56) References Cited

U.S. PATENT DOCUMENTS

| | | | | |
|---|---|---|---|---|
| 2007/0122041 A1* | 5/2007 | Moghaddam | ........ | G06K 9/6234 382/224 |
| 2008/0134193 A1* | 6/2008 | Corley | ........ | G06F 9/52 718/104 |
| 2011/0123100 A1* | 5/2011 | Carroll | ........ | G06F 19/3437 382/155 |
| 2011/0282925 A1* | 11/2011 | Kanevsky | ........ | G06F 17/11 708/207 |
| 2012/0179634 A1* | 7/2012 | Chen | ........ | G06N 99/005 706/12 |

OTHER PUBLICATIONS

Robert Tibshirani, "Regression Shrinkage and Selection via the Lasso", Journal of the Royal Statistical Society. Series B (Methological), (1996), pp. 267-288, vol. 58 No. 1.

Andrew Y. Ng, Feature selection, $L_1$ vs. $L_2$ regularization, and rotational invariance, Proceedings of the 21st International Conference on Machine Learning, (2004), pp. 1-8.

Jerome Friedman et al., Sparse inverse covariance estimation with the graphical lasso, Biostatistics Advance Access, Dec. 12, 2007, pp. 432-441.

(Continued)

*Primary Examiner* — Alan Chen
(74) *Attorney, Agent, or Firm* — Sughrue Mion, PLLC

(57) ABSTRACT

A gradient computation unit computes a gradient of an objective function in a variable to be optimized. An added variable selection unit adds a variable corresponding to a largest absolute value of the computed gradient from among variables included in a variable set, to a nonzero variable set. A variable optimization unit optimizes a value of the variable to be optimized, for each variable included in the nonzero variable set. A deleted variable selection unit deletes a variable that, when deleted, causes a smallest increase of the objective function from among variables included in the nonzero variable set, from the nonzero variable set. An objective function evaluation unit computes a value of the objective function for the variable to be optimized.

10 Claims, 3 Drawing Sheets

(56) References Cited

OTHER PUBLICATIONS

Tong Zhange, "Sparse Recovery with Orthogonal Matching Pursuit under RIP", IEEE Transactions on Information Theory, (2011), 57(9): pp. 6215-6221.

Tong Zhange, 'Adaptive Forward-backward Greedy Algorithm for Learning Sparse Representations', IEEE Transaction on Information Theory, (2011), 57(7), pp. 4689-4708.

Ali Jalali et al., "On Learning Discrete Graphical Models Using Greedy Methods", Neural Information Processing Systems, (2011), pp. 1-9.

\* cited by examiner

SPARSE VARIABLE OPTIMIZATION DEVICE, SPARSE VARIABLE OPTIMIZATION METHOD, AND SPARSE VARIABLE OPTIMIZATION PROGRAM

This application claims priority to U.S. Provisional Application No. 61/767,038 and filed Feb. 20, 2013, which is incorporated by reference.

BACKGROUND OF THE INVENTION

1. Field of the Invention

The present invention relates to a sparse variable optimization device, a sparse variable optimization method, and a sparse variable optimization program for optimizing variables of a sparse structure having a constraint that many of variables to be optimized are zero.

2. Description of the Related Art

Optimization of convex functions is a basic technique employed in various fields such as machine learning, signal processing, pattern recognition, and financial engineering. Particularly in optimization problems dealing with large-scale variables in recent years, optimization with a sparsity constraint that many variables are zero in an optimum solution is important.

As an example, when modeling health risk scores by a logistic regression model and optimizing it, the model needs to be controlled so that only risk-contributing variables are nonzero and non-risk-contributing variables are zero. In this way, for instance, which health examination items are risk-contributing can be modeled.

As another example, when analyzing correlations in network traffic, analysis of a precision matrix (the inverse of a covariance matrix) is typically carried out. Upon computing the precision matrix, the problem needs to be solved with a constraint that variables that are truly not in dependency relationships are zero. This is also a convex function optimization problem having a sparsity constraint on variables.

A convex function optimization problem having a sparsity constraint is normally a combinatorial optimization problem. In other words, this optimization problem is a problem of optimizing a combination indicating which variables are zero and which variables are nonzero. In a large-scale case, it is virtually impossible to obtain a strict solution due to computational time. Accordingly, two main types of approximate optimization methods have typically been proposed.

One method is a method of approximating the sparsity constraint by a convex function to convert the whole optimization problem to convex optimization. The most representative example is a method in which a constraint that there are many nonzero elements of variables is replaced with a constraint that an L1 norm of variables is small. The L1 norm mentioned here is a convex function.

Examples of such a method include: linear regression model optimization having a sparsity constraint (lasso, see Non Patent Literature (NPL) 1); logistic regression model optimization (L1 logistic regression, see NPL 2); and precision matrix optimization (graph lasso, see NPL 3). A fundamental idea common to these methods is to facilitate computation by approximating the original combinatorial optimization problem to another optimization problem that is easy to solve and solving the problem.

The other method is a method that improves an optimum solution search method, and is commonly referred to as "greedy search". For instance, in a search technique called "orthogonal matching pursuit (OMP)" described in NPL 4, starting from a state where all variables are zero, variables that minimize an objective function of optimization are added forward one by one.

Forward-backward greedy search (FoBa, see NPL 5 and NPL 6) has also been proposed in recent years. This method adds a search process of deleting an added variable by some criterion between the forward processes such as OMP, and has been proved to have theoretically excellent features.

CITATION LIST

Non Patent Literatures

[NPL 1] Tibshirani, R. (1996) Regression shrinkage and selection via the lasso. Journal of the Royal Statistical Society, B 58, 267-288, 2007.
[NPL 2] Ng, A. Y. 2004. Feature selection, 11 vs. 12 regularization, and rotational invariance. In Proceedings of International Conference on Machine Learning, 2004.
[NPL 3] Jerome Friedman, Trevor Hastie, and Robert Tibshirani. Sparse inverse covariance estimation with the graphical lasso. Biostatistics, 9:432-441, 2007.
[NPL 4] Zhang, T. Sparse recovery with orthogonal matching pursuit under rip. IEEE Transactions on Information Theory, 57(9):6215-6221, 2011.
[NPL 5] Zhang, T. Adaptive forward-backward greedy algorithm for learning sparse representations. IEEE Transactions on Information Theory, 57(7):4689-4708, 2011.
[NPL 6] Jalali, A., Johnson, C. C., and Ravikumar, P. D. On learning discrete graphical models using greedy methods. Neural Information Processing Systems, 2011.

SUMMARY OF THE INVENTION

An exemplary object of the present invention is to provide a sparse variable optimization device, a sparse variable optimization method, and a sparse variable optimization program that are capable of optimization with lower computational complexity even in the case where there is no closed-form solution.

An exemplary aspect of the present invention is a sparse variable optimization device including: a gradient computation unit for computing a gradient of an objective function in a designated value of a variable; an added variable selection unit for adding one of variables included in a variable set, to a nonzero variable set; a variable optimization unit for optimizing a value of a variable to be optimized, for each variable included in the nonzero variable set; a deleted variable selection unit for deleting a variable that, when deleted, causes a smallest increase of the objective function from among variables included in the nonzero variable set, from the nonzero variable set; and an objective function evaluation unit for computing a value of the objective function for the variable to be optimized, wherein the gradient computation unit computes the gradient of the objective function in the variable to be optimized, and wherein the added variable selection unit adds a variable corresponding to a largest absolute value of the computed gradient from among the variables included in the variable set, to the nonzero variable set.

An exemplary aspect of the present invention is a sparse variable optimization method including: computing a gradient of an objective function in a designated value of a variable; adding one of variables included in a variable set, to a nonzero variable set; optimizing a value of a variable to be optimized, for each variable included in the nonzero variable set; deleting a variable that, when deleted, causes a smallest increase of the objective function from among variables included in the nonzero variable set, from the nonzero variable set; and computing a value of the objective function for the variable to be optimized, wherein when computing the gradient, the gradient of the objective function in the variable to be optimized is computed, and wherein a variable corresponding to a largest absolute value of the computed gradient from among the variables included in the variable set is added to the nonzero variable set.

An exemplary aspect of the present invention is a non-transitory computer readable information recording medium storing a sparse variable optimization program that, when executed by a processor, performs a method for: computing a gradient of an objective function in a designated value of a variable; adding one of variables included in a variable set, to a nonzero variable set; optimizing a value of a variable to be optimized, for each variable included in the nonzero variable set; deleting a variable that, when deleted, causes a smallest increase of the objective function from among variables included in the nonzero variable set, from the nonzero variable set; and computing a value of the objective function for the variable to be optimized, wherein when computing the gradient, the gradient of the objective function in the variable to be optimized is computed, and wherein a variable corresponding to a largest absolute value of the computed gradient from among the variables included in the variable set is added to the nonzero variable set.

DESCRIPTION OF THE PREFERRED EMBODIMENTS

Figure 1:
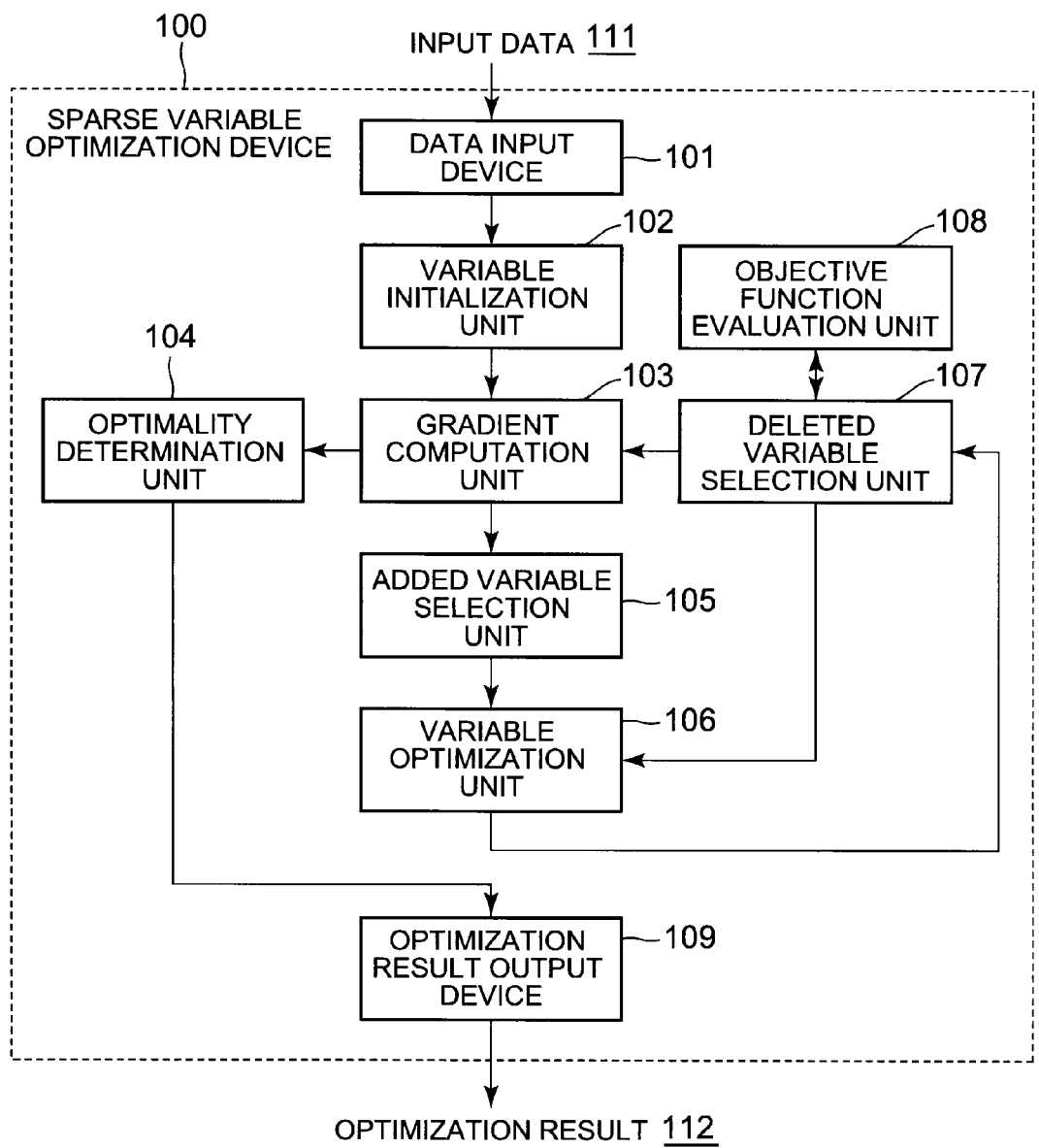
[FIG. 1] It is a block diagram depicting an exemplary embodiment of a sparse variable optimization device according to the present invention.

The present invention is a technique that improves the problem of FoBa proposed in NPL 5 and NPL 6. To clarify the difference, the procedure of FoBa in NPL 5 and NPL 6 is described first. In the following description, a set of variables with zero value is referred to as "variable pool", and variables selected as nonzero value are referred to as "nonzero variables".

FoBa step 1: Variables to be optimized are all initialized to zero.

FoBa step 2: One variable is selected from the variable pool, and a one-variable optimization problem is solved. This is performed on all variables in the variable pool, and a variable that improves an objective function most is added to the nonzero variables.

FoBa step 3: The nonzero variables and the variable pool are fixed, and the variables are optimized. That is, the values of the nonzero variables are optimized.

FoBa step 4: In the case where the improvement of the objective function before and after FoBa step 3 is sufficiently small, the optimization is completed.

FoBa step 5: One variable is selected from the nonzero variables, and the degradation of the objective function in the case of deleting the variable is evaluated. This is performed on all nonzero variables. In the case where the degradation of the objective function is sufficiently small, a variable corresponding to the smallest degradation is added to the variable pool, i.e. the variable is set to zero.

FoBa step 6: The process of FoBa step 5 is continued until there is no more variable satisfying the condition that the degradation of the objective function is sufficiently small.

FoBa step 7: The procedure proceeds to the process of FoBa step 2, and the optimization is continued.

When using the procedure of FoBa described in NPL 5 and NPL 6, high-speed computation is possible in the case where there is a closed-form solution as in, for example, a square loss function described in NPL 5. In a typical convex function mentioned above, however, there is no closed-form solution even in one-variable optimization, so that high computational complexity is required especially when the number of variables is large. This is because a one-variable optimization problem needs to be solved in FoBa step 2. An exemplary embodiment of the present invention for solving this problem is described below, with reference to drawings.

Hereafter, a variable to be optimized is denoted by $w=(w1, \ldots, wD)$, an objective function is denoted by $f(w)$, a whole variable set is denoted by $F$, a current nonzero variable set is denoted by $F(k)$, and a current variable pool (a set of variables with zero value which are not included in $F(k)$ from among the variables included in $F$) is denoted by $Fp(k)$.

Based on these denotations, an optimization problem with a constraint that many variables are zero is typically written as min_w f(w)

subject to $|w|\_0 \leq K$ where $|w|\_0$ is an L0 norm of w and indicates the number of nonzero elements, and K is an input parameter for controlling to what extent nonzero elements remain in the variables w to be optimized.

FIG. 1 is a block diagram depicting an exemplary embodiment of a sparse variable optimization device according to the present invention. A sparse variable optimization device 100 in this exemplary embodiment includes a data input device 101, a variable initialization unit 102, a gradient computation unit 103, an optimality determination unit 104, an added variable selection unit 105, a variable optimization unit 106, a deleted variable selection unit 107, an objective function evaluation unit 108, and an optimization result output device 109.

The sparse variable optimization device 100 receives input data 111, optimizes variables for the input data 111, and outputs an optimization result 112.

The data input device 101 is a device for receiving the input data 111, and receives the type of the objective function, parameters necessary for subsequent processes, and the like. The data input device 101 also receives data necessary for optimization according to need, for example in the case of optimizing a logistic regression model of health risk scores from data as mentioned earlier.

The variable initialization unit 102 sets k=0, and initializes F(k) to an empty set, Fp(k) to all variables (F), and w to a zero vector.

The gradient computation unit 103 computes a gradient of f(w) in the current w.

The optimality determination unit 104 determines whether or not the largest absolute value of the gradient vector of f(w) computed by the gradient computation unit 103 is sufficiently small.

The added variable selection unit 105 selects one variable corresponding to the largest absolute value of the gradient of f(w) in the current w from among the variables included in Fp(k), and deletes the variable from Fp(k) and adds it to F(k). Then, k=k+1.

The variable optimization unit 106 optimizes the value of w, for each variable included in F(k). Since the optimized value of f(w) is computed here, the variable optimization unit 106 can obtain the difference between the value of f(w) before the update and the value of f(w) after the update, as D(k).

The deleted variable selection unit 107 selects one variable that, when deleted, causes the smallest increase of f(w) from among the variables included in F(k), and deletes the variable from F(k) and adds it to Fp(k). Then, k=k−1.

The objective function evaluation unit 108 computes the value of f(w), for w.

The optimization result output device 109 outputs the optimized w, F(k), and other necessary parameters as the optimization result 112.

The variable initialization unit 102, the gradient computation unit 103, the optimality determination unit 104, the added variable selection unit 105, the variable optimization unit 106, the deleted variable selection unit 107, and the objective function evaluation unit 108 are, for example, realized by a CPU of a computer operating according to a program (sparse variable optimization program).

For instance, the program may be stored in a storage unit (not depicted) in the sparse variable optimization device 100, with the CPU reading the program and, according to the program, operating as the variable initialization unit 102, the gradient computation unit 103, the optimality determination unit 104, the added variable selection unit 105, the variable optimization unit 106, the deleted variable selection unit 107, and the objective function evaluation unit 108. The program may be stored in a computer-readable storage medium.

Alternatively, the variable initialization unit 102, the gradient computation unit 103, the optimality determination unit 104, the added variable selection unit 105, the variable optimization unit 106, the deleted variable selection unit 107, and the objective function evaluation unit 108 may each be realized by dedicated hardware.

Figure 2:
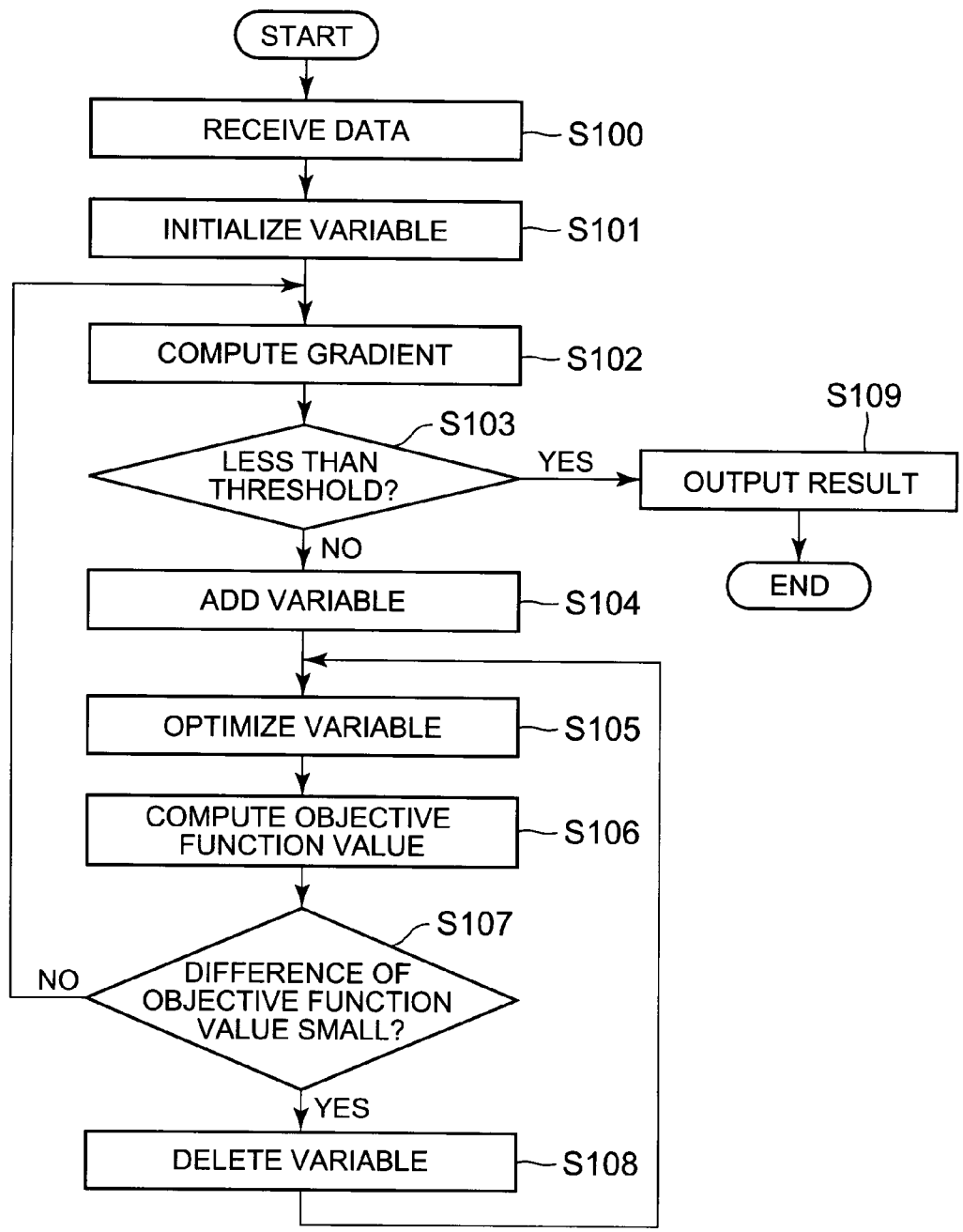
[FIG. 2] It is a flowchart depicting an example of an operation of a sparse variable optimization device 100.

The following describes an operation of the sparse variable optimization device 100 in this exemplary embodiment. FIG. 2 is a flowchart depicting an example of the operation of the sparse variable optimization device 100 in this exemplary embodiment.

First, the data input device 101 receives the input data 111 (step S100). Next, the variable initialization unit 102 sets k=0, and initializes F(k) to an empty set, Fp(k) to all variables (F), and w to a zero vector (step S101).

Next, the gradient computation unit 103 computes the gradient of f(w) in the current w (step S102). Next, the optimality determination unit 104 determines whether or not the largest absolute value of the gradient computed in step S102 for each variable is less than a threshold input as a parameter beforehand (step S103). This is a process of determining whether or not w is optimized.

In the case where the computation result is less than the threshold (step S103: Yes), the procedure proceeds to step S109. In the case where the computation result is not less than the threshold (step S103: No), the procedure proceeds to step S104.

In the case where the largest absolute value of the gradient is not less than the threshold in step S103, the added variable selection unit 105 deletes the variable corresponding to the largest absolute value of the gradient from Fp(k), and adds the variable to F(k) (step S104).

Next, the variable optimization unit 106 optimizes the variables included in F(k), for f(w) (step S105). In the case where the process performed immediately before this process is the variable addition process of step S104, the variable optimization unit 106 computes the difference between the value of f(w) before the update and the value of f(w) after the update, as D(k).

Next, the objective function evaluation unit 108 computes the value of f(w), for F(k). The computed value is denoted by (i). The objective function evaluation unit 108 also computes, for each variable included in F(k), the value of f(w) in the case where the value of the variable is set to zero. The computed value is denoted by (ii) (step S106).

Next, the deleted variable selection unit 107 determines whether or not the smallest difference between (ii) and (i) computed in step S106 is less than a*D(k) (step S107). This is a process of determining whether or not to delete a variable. Here, a is a threshold parameter input beforehand where 0<a<1.

In the case where the smallest difference is less than a*D(k) (step S107: Yes), the deleted variable selection unit 107 determines that a variable can be deleted. The procedure then proceeds to step S108. In the case where the smallest difference is not less than a*D(k) (step S107: No), on the other hand, the deleted variable selection unit 107 determines that there is no deletable variable. The procedure then proceeds to step S102.

In the case of determining that a variable can be deleted in step S107, the deleted variable selection unit 107 deletes the variable corresponding to the smallest difference between (ii) and (i) computed in step S106 from F(k), and adds the variable to Fp(k) (step S108). The procedure then proceeds to step S105.

In the case where the largest absolute value of the gradient is less than the threshold in step S103, w is determined as optimum, and the optimization result output device 109 outputs the optimization result 112 (step S109).

As described above, according to this exemplary embodiment, the gradient computation unit 103 computes the gradient of f(w) in w. The added variable selection unit 105 adds the variable corresponding to the largest absolute value of the computed gradient from among the variables included in Fp(k), to F(k). The variable optimization unit 106 optimizes the value of w, for each variable included in F(k). The deleted variable selection unit 107 deletes the variable that, when deleted, causes the smallest increase of f(w) from among the variables included in F(k), from F(k). The objective function evaluation unit 108 computes the value of f(w), for w. Thus, variables of a sparse structure can be optimized with lower computational complexity even in the case where there is no closed-form solution.

In detail, the substantial difference of the method according to this exemplary embodiment from typical FoBa lies in the variable addition process. In typical FoBa, in FoBa step 2 which is a variable addition step, it is necessary to solve the optimization problem for all variables included in Fp(k). This causes extremely high computational cost, except in such a special case where the objective function is a square loss function. In this exemplary embodiment, on the other hand, only the gradient for each variable included in Fp(k) is computed in steps S103 and S104, so that which variable is to be added can be computed at high speed.

EXAMPLE 1

The following describes the present invention by way of examples, though the scope of the present invention is not limited to the following description. Example 1 relates to the case of performing health risk analysis from health examination logs by applying the sparse variable optimization device according to the present invention.

Modeling the relations between lifestyle habits or health examination values and health or disease risk and performing risk prediction is applicable to disease prevention, risk analysis, lifestyle guidance, and so on.

An excessively complex risk prediction function cannot be understood by humans. It is therefore important to create a risk prediction function with a small number of variables from among input variables (various items of lifestyle habits or health examination values). Predicting with a small number of variables means that variables are sparse as many variables are zero.

Learning a risk score function by a logistic regression model is described below, as an example of the above-mentioned application. The logistic regression model is a method of modeling a risk index (e.g. whether or not blood pressure is higher than a threshold) as a risk probability p (p=1/(1+exp(−wx))), and is typically used in health and medical fields.

An L2 penalized likelihood function is often used in learning the logistic regression model. This corresponds to an objective function satisfying $f(w)=\Sigma n \log(1+\exp(-yn\,wxn))+\lambda\|w\|2$ in the present invention.

Note that (xn, yn) (n=1, . . . , N) is a learning sample. Here, xn denotes data obtained by vectoring each item of lifestyle habits or health examination values, yn (+1 or −1) denotes whether or not there is risk corresponding to xn, λ denotes an input parameter indicating the strength of the L2 penalized term, and $\|w\|2$ denotes the L2 norm of w.

In this case, the gradient computation unit 103 computes the gradient of the objective function representing the logistic regression model in the current w, and the deleted variable selection unit 107 deletes the variable that causes the smallest increase of the objective function from F(k).

By using the present invention, it is possible to obtain a model in which many elements of the parameter w are zero and only a small number of risk-related elements are nonzero. For example in the case of optimizing a hypertension risk prediction function, the use of the present invention enables obtainment of a human-understandable model in which only a small number of variables directly linked to the hypertension risk, such as body fatness and exercise habits, are used.

EXAMPLE 2

Example 2 relates to the case of performing correlation analysis between health examination logs by applying the sparse variable optimization device according to the present invention.

There are complex correlations between items of lifestyle habits or health examination values. In the case of analysis using normal correlation coefficients, there is a possibility that variables that are actually not correlated to each other are wrongly analyzed as being correlated to each other.

For example, in the case where the correlation between obesity and blood pressure is high and the correlation between obesity and blood sugar level is high, the correlation coefficient between blood pressure and blood sugar level appears to be high through the obesity variable, even though the correlation between blood pressure and blood sugar level is actually not high.

To prevent such wrong analysis, the inverse (hereafter "precision matrix") of a covariance matrix is commonly used as a correlation index. Each element of the precision matrix indicates the conditional correlation between the corresponding variables. That is, each element of the precision matrix indicates the correlation in the case where the other variables are all given. In the above-mentioned example, even when the correlation between blood pressure and blood sugar level appears to be high through obesity, the conditional correlation is low.

In the case of estimating the precision matrix from data, there is a problem that an element corresponding to variables that are actually not correlated to each other is not zero, due to noise included in the data. It is therefore important to perform optimization so that many off-diagonal elements (conditional correlations between variables) of the precision matrix are zero.

Let S be the precision matrix, and C be the covariance matrix estimated from the data. In the present invention, the objective function can be interpreted as $f(S)=S*C-\log\det(S)$, and the number of off-diagonal nonzero components of S as not more than K. Here, S*C denotes the inner product of S and C, and det(S) denotes the matrix product of S.

That is, the variable w to be optimized corresponds to the off-diagonal element of the precision matrix S, the objective function f(w) corresponds to the covariance function f(S) defined based on the precision matrix S and the covariance matrix C, and F(k) corresponds to the off-diagonal nonzero component of the precision matrix S.

In this case, the gradient computation unit 103 computes the gradient of f(S) in the off-diagonal element of the precision matrix S. The variable optimization unit 106 optimizes, for each off-diagonal nonzero component of the precision matrix S, the off-diagonal element of the precision matrix. The deleted variable selection unit 107 sets the nonzero component that, when deleted, causes the smallest increase of f(S) from among the off-diagonal nonzero components of the precision matrix S, to zero. The objective function evaluation unit 108 computes the value of f(S) for the off-diagonal element of the precision matrix S.

By optimizing the sparse precision matrix using the present invention in this way, it is possible to discover correlations between various items of lifestyle habits or health examination values.

Figure 3:
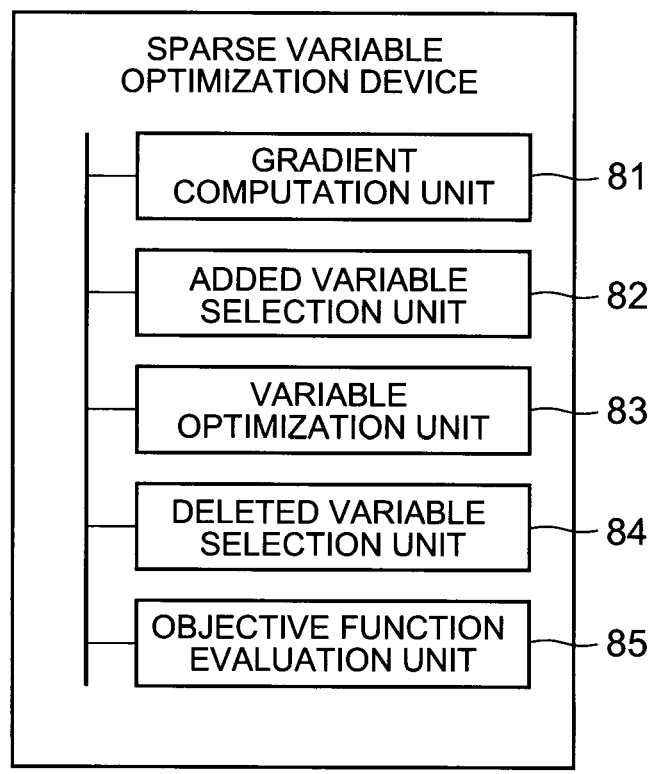
[FIG. 3] It is a block diagram depicting an overview of a sparse variable optimization device according to the present invention.

The following describes an overview of the present invention. FIG. 3 is a block diagram depicting an overview of a sparse variable optimization device according to the present invention. The sparse variable optimization device according to the present invention includes: a gradient computation unit 81 (e.g. the gradient computation unit 103) for computing a gradient of an objective function (e.g. f(w)) in a designated value (in detail, the current optimum value) of a variable; an added variable selection unit 82 (e.g. the added variable selection unit 105) for adding one of variables included in a variable set (e.g. Fp(k)), to a nonzero variable set (e.g. F(k)); a variable optimization unit 83 (e.g. the variable optimization unit 106) for optimizing a value of a variable (e.g. w) to be optimized, for each variable included in the nonzero variable set; a deleted variable selection unit 84 (e.g. the deleted variable selection unit 107) for deleting a variable that, when deleted, causes a smallest increase (e.g. a*D(k)) of the objective function from among variables included in the nonzero variable set, from the nonzero variable set; and an objective function evaluation unit 85 (e.g. the objective function evaluation unit 108) for computing a value of the objective function for the variable to be optimized.

The gradient computation unit 81 computes the gradient of the objective function in the variable to be optimized, and the added variable selection unit 82 adds a variable corresponding to a largest absolute value of the computed gradient from among the variables included in the variable set, to the nonzero variable set.

With such a structure, variables of a sparse structure can be optimized with lower computational complexity even in the case where there is no closed-form solution.

Moreover, the gradient computation unit 81 may compute the gradient of the objective function in the variable to be optimized, the objective function (e.g. an L2 penalized likelihood function) representing a logistic regression model. The deleted variable selection unit 84 may then delete the variable that causes the smallest increase of the objective function, from the nonzero variable set.

Moreover, the gradient computation unit 81 may use a covariance function (e.g. f(S)) as the objective function, and compute the gradient of the objective function in an off-diagonal element of a precision matrix (e.g. S) which is an inverse of a covariance matrix. In this case, the variable optimization unit 83 may optimize the off-diagonal element of the precision matrix, for each off-diagonal nonzero component of the precision matrix, the deleted variable selection unit 84 may set a nonzero component that, when deleted, causes the smallest increase of the objective function from among off-diagonal nonzero components of the precision matrix, to zero, and the objective function evaluation unit 85 may compute the value of the objective function for the off-diagonal element of the precision matrix.

Moreover, the sparse variable optimization device may include an optimality determination unit (e.g. the optimality determination unit 104) for determining that the variable to be optimized is optimized, in the case where the largest absolute value of the computed gradient is less than a predetermined threshold.

The methods described in NPL 1 to NPL 3 are problematic in that the solution precision is poor as compared with the methods described in NPL 4 to NPL 6, because the problem itself is approximated.

The method (OMP) described in NPL 4 is problematic in that the final solution is poor because there is no process of deleting a once added variable later (i.e. setting the variable to zero).

The methods (FoBa) described in NPL 5 and NPL 6 enable high-speed computation in the case where there is a closed-form solution. In the case of typical convex functions such as the above-mentioned optimization of the logistic regression or the precision matrix, however, there is no closed-form solution even in one-variable optimization, and so the methods (FoBa) described in NPL 5 and NPL 6 are problematic in that high computational complexity is required especially when the number of variables is large.

According to the present invention, variables of a sparse structure can be optimized with lower computational complexity even in the case where there is no closed-form solution.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A sparse variable optimization device comprising:
    a gradient computation unit for computing a gradient of an objective function in a designated value of a variable;
    an added variable selection unit for adding one of variables included in a variable set, to a nonzero variable set;
    a variable optimization unit for optimizing a value of a variable to be optimized, for each variable included in the nonzero variable set;
    a deleted variable selection unit for deleting a variable that, when deleted, causes a smallest increase of the objective function from among variables included in the nonzero variable set, from the nonzero variable set; and
    an objective function evaluation unit for computing a value of the objective function for the variable to be optimized,
    wherein the gradient computation unit computes the gradient of the objective function in the variable to be optimized, and
    wherein the added variable selection unit adds a variable corresponding to a largest absolute value of the computed gradient from among the variables included in the variable set, to the nonzero variable set.

2. The sparse variable optimization device according to claim 1, wherein the gradient computation unit computes the gradient of the objective function in the variable to be optimized, the objective function representing a logistic regression model, and
    wherein the deleted variable selection unit deletes the variable that causes the smallest increase of the objective function, from the nonzero variable set.

3. The sparse variable optimization device according to claim 1, wherein the gradient computation unit uses a covariance function as the objective function, and computes the gradient of the objective function in an off-diagonal element of a precision matrix which is an inverse of a covariance matrix,
    wherein the variable optimization unit optimizes the off-diagonal element of the precision matrix, for each off-diagonal nonzero component of the precision matrix,
    wherein the deleted variable selection unit sets a nonzero component that, when deleted, causes the smallest increase of the objective function from among off-diagonal nonzero components of the precision matrix, to zero, and
    wherein the objective function evaluation unit computes the value of the objective function for the off-diagonal element of the precision matrix.

4. The sparse variable optimization device according to claim 1, comprising
    an optimality determination unit for determining that the variable to be optimized is optimized, in the case where the largest absolute value of the computed gradient is less than a predetermined threshold.

5. The sparse variable optimization device according to claim 2, comprising
    an optimality determination unit for determining that the variable to be optimized is optimized, in the case where the largest absolute value of the computed gradient is less than a predetermined threshold.

6. The sparse variable optimization device according to claim 3, comprising
    an optimality determination unit for determining that the variable to be optimized is optimized, in the case where the largest absolute value of the computed gradient is less than a predetermined threshold.

7. A sparse variable optimization method comprising:
    computing a gradient of an objective function in a designated value of a variable;
    adding one of variables included in a variable set, to a nonzero variable set;
    optimizing a value of a variable to be optimized, for each variable included in the nonzero variable set;
    deleting a variable that, when deleted, causes a smallest increase of the objective function from among variables included in the nonzero variable set, from the nonzero variable set; and computing a value of the objective function for the variable to be optimized, wherein when computing the gradient, the gradient of the objective function in the variable to be optimized is computed, and wherein a variable corresponding to a largest absolute value of the computed gradient from among the variables included in the variable set is added to the nonzero variable set.

8. The sparse variable optimization method according to claim 7, wherein when computing the gradient, the gradient of the objective function in the variable to be optimized is computed, the objective function representing a logistic regression model, and wherein the variable that causes the smallest increase of the objective function is deleted from the nonzero variable set.

9. A non-transitory computer readable information recording medium storing a sparse variable optimization program that, when executed by a processor, performs a method for:

computing a gradient of an objective function in a designated value of a variable;

adding one of variables included in a variable set, to a nonzero variable set;

optimizing a value of a variable to be optimized, for each variable included in the nonzero variable set;

deleting a variable that, when deleted, causes a smallest increase of the objective function from among variables included in the nonzero variable set, from the nonzero variable set; and computing a value of the objective function for the variable to be optimized, wherein when computing the gradient, the gradient of the objective function in the variable to be optimized is computed, and wherein a variable corresponding to a largest absolute value of the computed gradient from among the variables included in the variable set is added to the nonzero variable set.

10. The non-transitory computer readable information recording medium according to claim 9, wherein when computing the gradient, the gradient of the objective function in the variable to be optimized is computed, the objective function representing a logistic regression model, and wherein the variable that causes the smallest increase of the objective function is deleted from the nonzero variable set.

* * * * *